United States Patent
Mendonsa et al.

(10) Patent No.: US 11,354,398 B2
(45) Date of Patent: Jun. 7, 2022

(54) OFF-CARTRIDGE ENCRYPTION KEY STORAGE FOR CARTRIDGE-BASED LIBRARY

(71) Applicant: Seagate Technology LLC, Cupertino, CA (US)

(72) Inventors: Riyan Alex Mendonsa, Minneapolis, MN (US); Saravanan Nagarajan, Singapore (SG); Kenneth A. Haapala, Minneapolis, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 57 days.

(21) Appl. No.: 16/806,831

(22) Filed: Mar. 2, 2020

(65) Prior Publication Data
US 2021/0271749 A1 Sep. 2, 2021

(51) Int. Cl.
| | | |
|---|---|---|
| G06F 21/00 | (2013.01) | |
| H04L 29/06 | (2006.01) | |
| G06F 21/44 | (2013.01) | |
| H04L 9/30 | (2006.01) | |
| G06F 21/80 | (2013.01) | |
| G06F 21/78 | (2013.01) | |

(52) U.S. Cl.
CPC .............. *G06F 21/445* (2013.01); *H04L 9/30* (2013.01)

(58) Field of Classification Search
CPC ................................. G06F 21/445; H04L 9/30
See application file for complete search history.

(56) References Cited

U.S. PATENT DOCUMENTS

| | | | |
|---|---|---|---|
| 7,489,510 B1 | 2/2009 | Hung et al. | |
| 8,527,780 B2 | 9/2013 | Roberts et al. | |
| 10,467,172 B2 * | 11/2019 | Shaw, II | G06F 13/4068 |
| 10,776,522 B1 | 9/2020 | McNeil et al. | |
| 2008/0063183 A1 | 3/2008 | Greco et al. | |
| 2008/0294906 A1 | 11/2008 | Chang et al. | |
| 2009/0052664 A1 * | 2/2009 | Goodman | G11B 20/00253 380/44 |
| 2009/0252330 A1 | 10/2009 | Patnal et al. | |
| 2016/0132699 A1 * | 5/2016 | Miller | G06F 21/80 713/193 |
| 2018/0024743 A1 | 1/2018 | Herman et al. | |

(Continued)

FOREIGN PATENT DOCUMENTS

WO  WO-2008028768 A1 * 3/2008 ............. G06F 21/80

OTHER PUBLICATIONS

S.S. Coleman; R.W. Watson; "The emerging paradigm shift in storage system architectures"; Proceedings of the IEEE; Year: Apr. 1993 | vol. 81, Issue:4 | Journal Article | Publisher: IEEE | pp. 607-620 (Year: 1993).*

*Primary Examiner* — Shewaye Gelagay
*Assistant Examiner* — Courtney D Fields
(74) *Attorney, Agent, or Firm* — Holzer Patel Drennan (57) ABSTRACT

A secure cartridge-based storage system includes a set of read/write control electronics on a control board adapted to removably couple with each of a plurality of storage cartridges. For each individual storage cartridge, the read/write electronics are adapted to retrieve a unique device identifier from the storage cartridge; retrieve an encryption key stored on the control board in association with the unique device identifier; and utilize the encryption key to encrypt or decrypt data that is in transit to or from a target storage location on the storage media.

16 Claims, 7 Drawing Sheets

(56) References Cited

U.S. PATENT DOCUMENTS

| | | |
|---|---|---|
| 2018/0062850 A1 | 3/2018 | Anderson et al. |
| 2019/0007204 A1 | 1/2019 | Field et al. |
| 2021/0218566 A1 | 7/2021 | Mastenbrook et al. |

* cited by examiner

OFF-CARTRIDGE ENCRYPTION KEY STORAGE FOR CARTRIDGE-BASED LIBRARY

SUMMARY

An example storage system includes multiple portable storage cartridges that independently lack read/write control electronics. Each storage cartridge is adapted to removably couple to a shared control board hosting a shared set of read/write control electronics. To read or write data to a select one of the storage cartridges, the read/write control electronics retrieve a unique device identifier from the storage cartridge and identify an encryption key stored on the control board in association with the unique device identifier. The read/write control electronics then utilize the encryption key to encrypt or decrypt data that is in transit to or from a target storage location on the select storage cartridge.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTION

Some secure data storage devices include control circuitry for encrypting user data during data writes and/or decrypting such data during reads. For example, a secure storage drive may prohibit read/write access until a user provides a pin (public key) that the storage drive has associated in memory with the encryption key (private key). Responsive to successful authentication of the pin, the control circuitry accesses the encryption key for use encryption and decryption during host-initiated read and write operations.

A secure storage device typically stores an encryption key somewhere other than the device's primary storage media, since the data on the primary media is itself encrypted with the key. The encryption key may, for example, be stored in non-volatile memory accessible by the device's read/write control system or within a hardware register of the read/write control system. In the example of a hard drive disk assembly (HDA), the encryption key may be stored within the HDA's system-on-chip (SoC), which functions as the read/write control system. The SoC is traditionally located on a printed circuit board assembly (PCBA) within the drive. In many of the systems disclosed herein, data is stored on portable storage cartridges that lack the PCBA, SoC, and independent read/write control electronics.

The term "storage cartridges" is used herein to refer to an exemplary type of portable storage drive lacking an independent set of read/write controls. By example and without limitation, the exemplary storage cartridges described herein are shown to resemble conventional hard drive disks (HDD) but without certain mechanical and electrical features that would otherwise be necessary to enable the cartridge to operate in a stand-alone fashion. Each storage cartridge may, for example, generally assume the form of an HDD minus control electronics and, in some cases, other elements that can be offloaded from the cartridge and supplied by the actuated media player, such as VCM magnets and spindle motor components. The removal of these elements from the individual cartridges in the library allows the provisioning of a large-scale, high-capacity storage system with the benefits of magnetic disc storage at a significantly lower cost. In some implementations, the storage cartridges in the secure cartridge-based storage system may include SSD-based storage media with read/write control electronics removed to the associated media player(s).

The growing use of cloud-based storage solutions has driven demand for low-cost data storage systems capable of retaining large volumes of data. In recent years, this demand has driven development of storage solutions with read/write control systems that are shared between groups of hot-swappable drives. In these systems, some or all of the read/write control electronics traditionally included within each individual drive may be displaced from the drive's enclosure to a shared control board with an interconnect that couples the read/write control electronics to several different drives. These read/write control electronics located on the shared control board may generate the read/write control signals to control data access to each of multiple drives.

Some of these systems with centralized, shared read/write controls have a shared "control board" that is designed to removably couple to individual drives that individually lack memory and secondary storage traditionally used to store secure drive encryption keys. When these resources (e.g., the read/write control system) are displaced from individual drive enclosures to locations where they are instead shared by multiple drives, challenges arise relating to where to a drive-specific encryption key may be stored without creating data security vulnerabilities.

Figure 1:
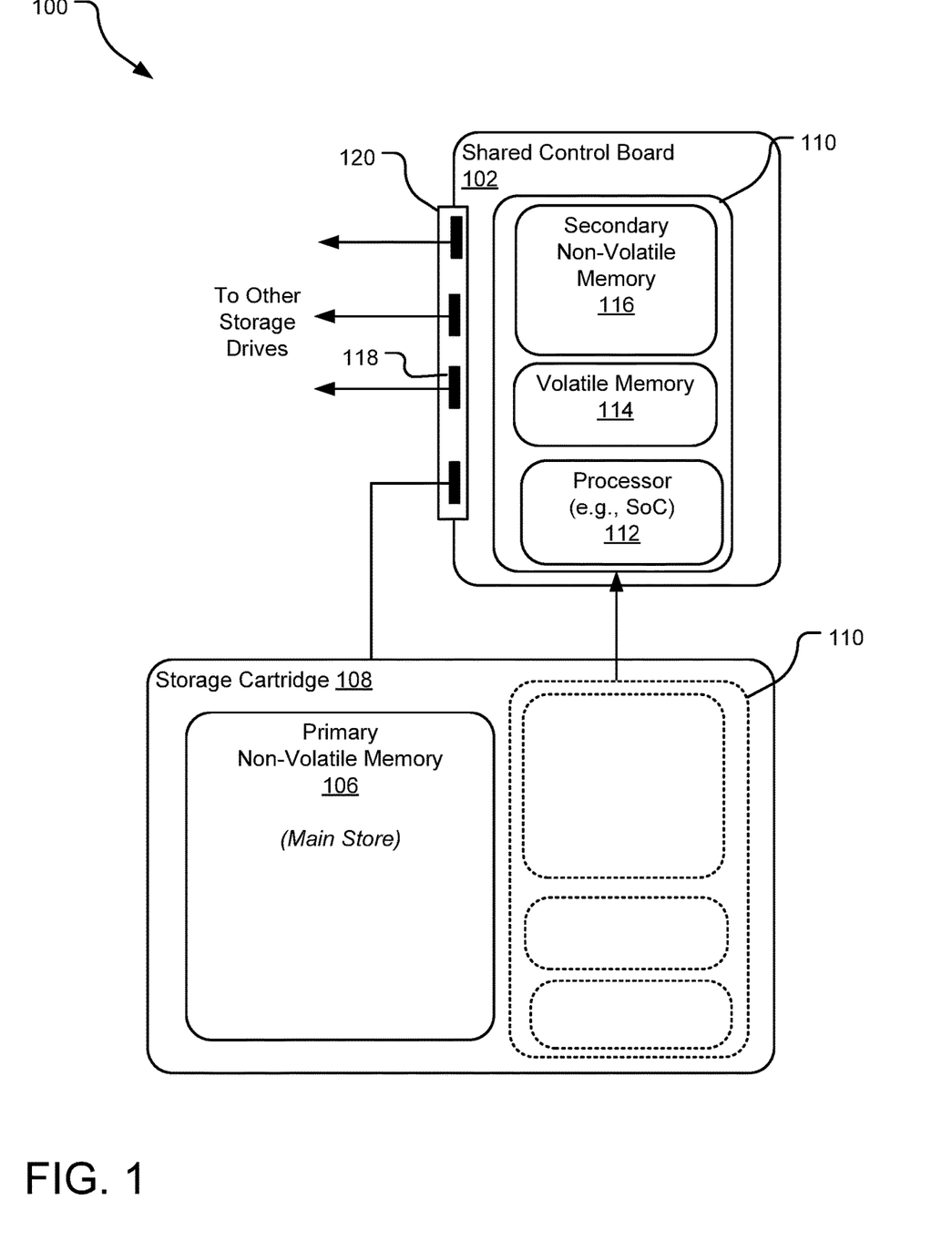
FIG. 1 illustrates an exemplary secure cartridge-based storage system including a storage drive that lacks traditional storage and processing resources for storing an encryption key and encryption circuitry.

FIG. 1 illustrates an exemplary storage system 100 including a storage cartridge 108 that lacks traditional storage and processing resources for storing an encryption key used to encrypt data being written to a primary non-volatile memory 106 and to decrypt data being read from the primary non-volatile memory 106. The primary non-volatile memory 106 may include one or more types of non-volatile storage media including, for example, magnetic disks, optical drives, flash, etc. Data blocks within the primary non-volatile memory 106 collectively comprise a "main store," which refers to a collection of physical data blocks mapped to a range of logical block addresses (LBAs) utilized by a host device when reading and writing data to the data storage device.

The storage cartridge 108 is coupled to a shared control board 102 that includes read/write control electronics 110 for generating the read and write signals to access the primary non-volatile memory 106 as well as the read and write signals for accessing primary non-volatile memory within other drives that are also coupled to the shared control board 102 through various ports (e.g., a port 118) in an interconnect 120.

Although the specific read/write control electronics 110 included on the shared control board 102 may vary from one implementation to another, the read/write control electronics of FIG. 1 include at least a processor 112, volatile memory 114 (e.g., DRAM), and a secondary non-volatile memory 116 (e.g., Flash). As indicated by dotted lines within the storage cartridge 108, the read/write control electronics 110 represent a collection of electronics traditionally included within an enclosure of the storage cartridge 108 that have, in FIG. 1, been displaced to the shared control board 102.

In secure drive technologies, it is desirable to protect data stored in the primary non-volatile memory 106 with an encryption key so that the storage cartridge 108 cannot be accessed by an unauthorized user. Such an encryption key may, for example, prevent access and misappropriation of data stored on the storage cartridge 108 in the event that the storage cartridge 108 is stolen from a storage center. In the illustrated system 100, however, the storage cartridge 108 lacks both control electronics and the associated secondary non-volatile memory 116 accessed by the control electronics. Therefore, the locations traditionally used to store encryption keys no longer exist within the storage cartridge 108. This gives rise to a number of practical challenges to locating the encryption key and—in cases where the stored encryption key is separated from the storage drive 106—in identifying the appropriate stored encryption key for use with respect to a given drive.

The herein disclosed solutions to the above-described challenges fall into two broad categories: (1) implementations storing the encryption key on or within the storage cartridge 108 and (2) implementations storing the encryption key at a location remote from the storage cartridge 108). Example implementations are explored with respect to the following figures.

Notably, aspects of the various control electronics within the shared control board 102 and/or the storage cartridge 108 may be implemented in a tangible computer-readable storage media readable by a computing node within or communicatively coupled to the mass data storage system. The term "tangible computer-readable storage media" includes, but is not limited to, random access memory ("RAM"), ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. As used herein, the term "tangible computer-readable media" excludes transitory media such as propagating signals. In contrast to tangible computer-readable storage media, intangible computer-readable communication signals may embody computer readable instructions, data structures, program modules, or other data resident in a modulated data signal, such as a carrier wave or other signal transport mechanism.

Figure 2:
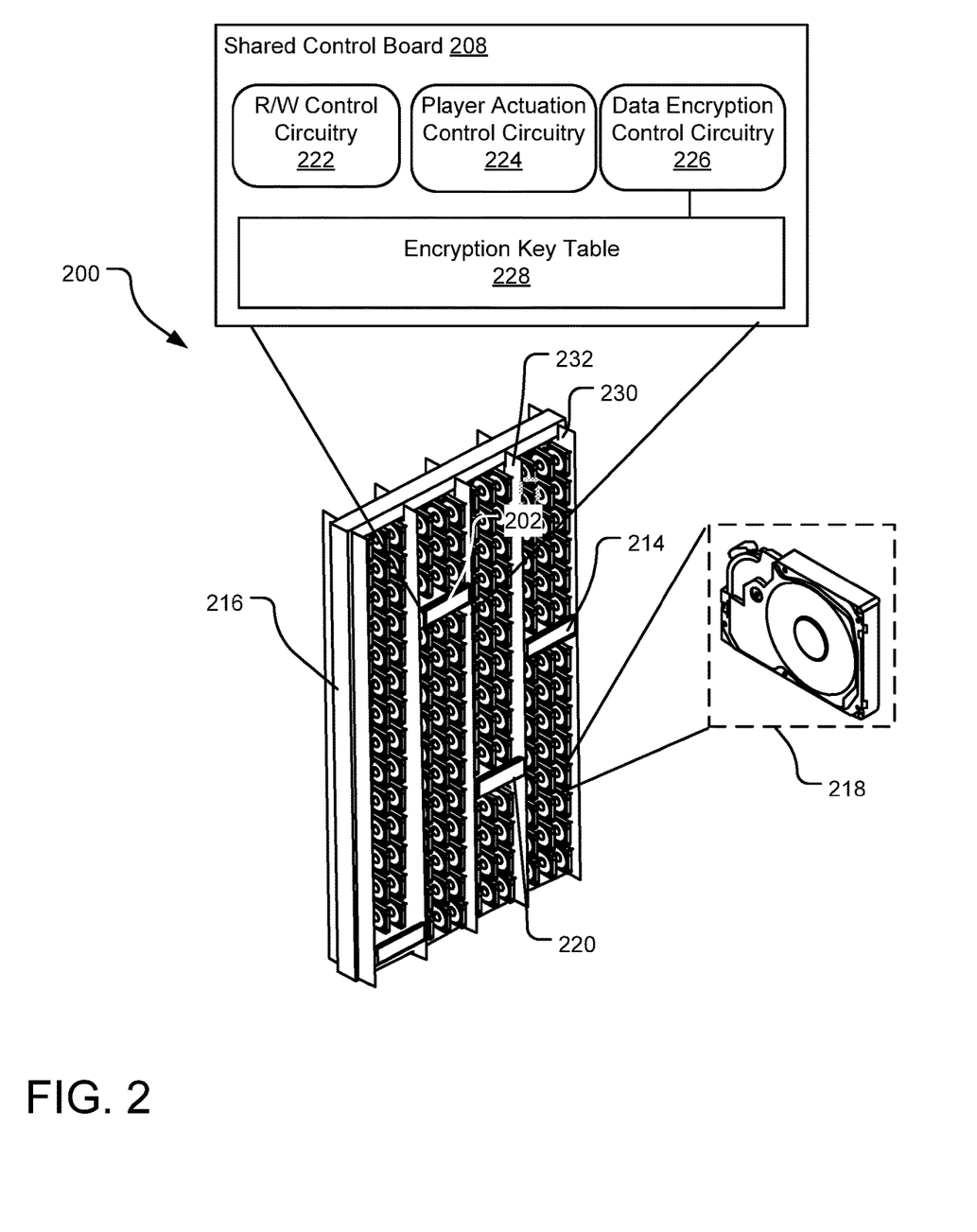
FIG. 2 illustrates an example secure cartridge-based storage system including storage cartridges that lack independent read/write control electronics.

FIG. 2 illustrates an example secure cartridge-based storage system 200 including multiple storage cartridges (e.g., a storage cartridge 218) that lack independent read/write control electronics. In this system, encryption control circuitry is stored on a shared control board 208 that provides read and write access to a subset of the multiple different storage cartridges by removably coupling to and from select storage cartridges to execute host-initiated read and write commands. The storage cartridges are shown arranged on a common rack, but may in other implementations be arranged in one or more drawer(s), shelves, groupings of racks, etc. The secure cartridge-based storage system 200 includes one or more media players 202, 214, 220, that each includes a shared control board that is to be understand as including the same or similar features as the exemplary shared control board 208 incorporated within the media player 202. The shared control board 208 includes a printed circuit board assembly (PCBA) that incorporates various controls for providing selective data access to the individual cartridges as well as for encrypting and decrypting data stored on the various storage cartridges.

Each of the media players 202, 214, and 220 is designed to move across a range of rack positions and provide data access to a subset of the storage cartridges in the rack 216. For example, the media player 202 may include actuation electronics to self-ambulate up and down relative to a column of storage cartridges and/or to move left and right relative to a row of storage cartridges. The arrangement, size, and exemplary movements of the media players 202, 214, 220 discussed herein is intended to be exemplary as such characteristics may vary widely from one implementation to another.

The media player 202 is shown to include read/write (R/W) control circuitry 222, player actuation control circuitry 224, and data encryption control circuitry 226, each of which are intended to represent a collection of hardware and software elements, including for example control instructions executed by one or more separate or shared device controllers (e.g., microprocessors), peripheral interface controllers ("PICs"), application-specific integrated circuits ("ASICs"), systems on chips ("SoCs"), etc.

The R/W control circuitry 222 executes read and write commands from a system host on the various storage cartridges within the rack 216. For example, the R/W control circuitry 222 may perform actions that effectively engage switches to open appropriate read/write channels, select a preamplifier and configure preamplifier settings for read/write operations, control actuator movement for positioning various read/write heads of a select storage cartridge, spin up or down a spindle motor within a storage cartridge, controllably actuate a voice coil motor (VCM) within a storage cartridge, and/or control other electronics that facilitate power and data access to (e.g., read write access) the storage cartridges.

The player actuation control circuitry 224, in contrast, selectively controls actuation robotics effect to movements of the media player 202 relative to the rack 216, such as to position the media player 202 for data access to different storage cartridges within the rack 216.

As used here, the terms "encryption circuit" or "encryption control circuitry" are intended to refer to hardware and/or software components that function to either encrypt or decrypt data. The data encryption control circuitry 226 executes certain actions for encrypting data being written to the various storage cartridges in the cartridge-based library and for decrypting data that is read back from the various storage cartridges. In one implementation, the data encryption control circuitry 226 manages an encryption key table 228 that stores storage device identifiers in association with encryption key(s) that are to be used for encrypting and decrypting data on each associated storage cartridge in the secure cartridge-based storage system 200. The individual storage cartridges (e.g., the storage cartridge 218) do not store the encryption keys used in encrypting and decrypting the locally-stored data. Accordingly, the data stored on each cartridge is fully protected from misappropriation in the event that any individual storage cartridge is stolen.

Although not shown, the shared control board 208 may further include circuitry for communicating with a host device (e.g., a rack-based controller or facility server) as well as power controls for selectively powering up and down each of the individual cartridges when selectively coupled to such cartridges. In some implementations, each of the media players 202, 214, 220 may be adapted to provide selectively couple with and/or provide parallel data access to multiple storage cartridges at a once.

Figure 3:
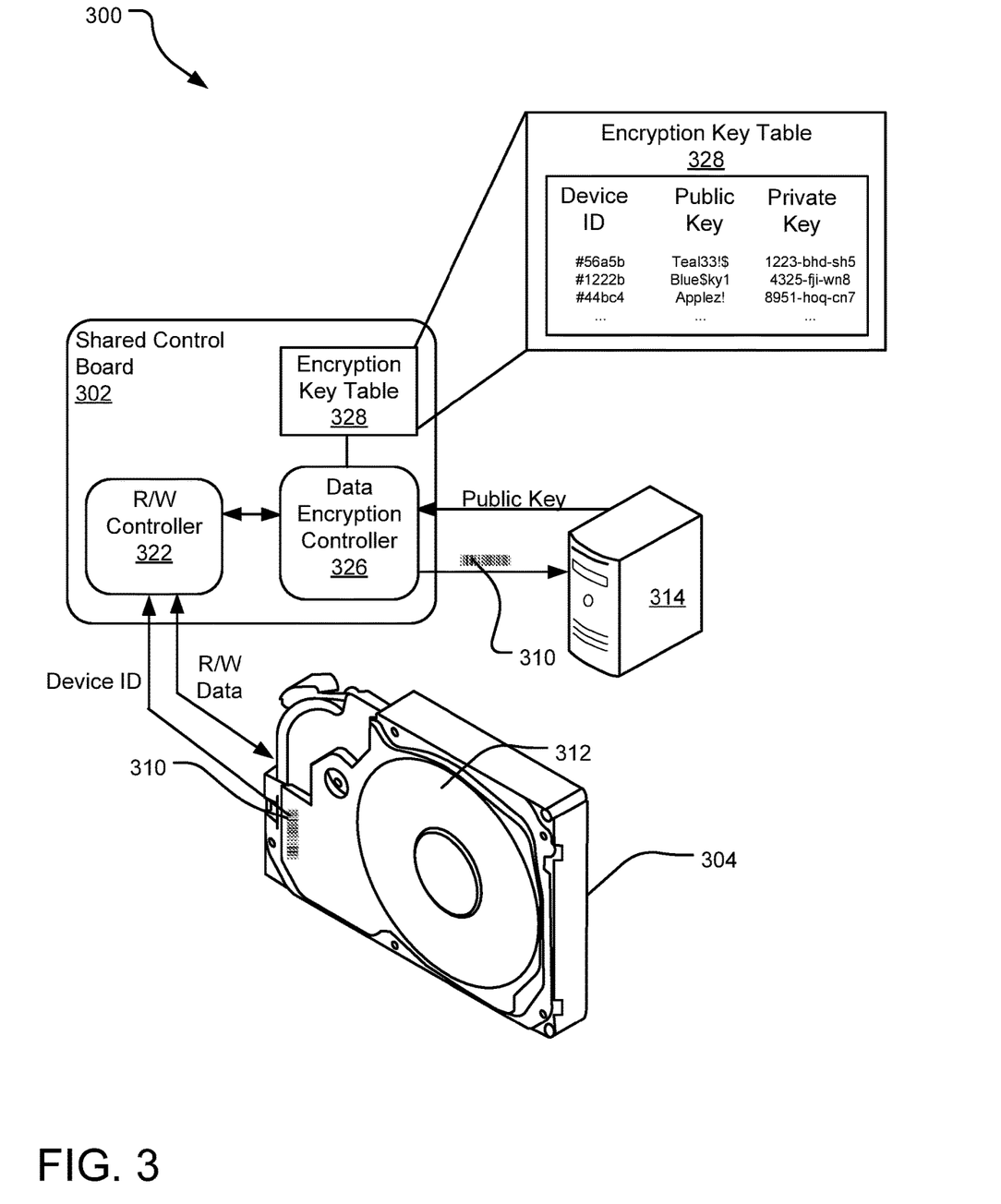
FIG. 3 illustrates aspects of another example secure cartridge-based storage system in which data encryption control circuitry is stored on a shared control board including read/write controls that provide data access to multiple different storage cartridges.

FIG. 3 illustrates aspects of another example secure cartridge-based storage system 300 in which data encryption control circuitry is stored on a shared control board 302 including the read/write controls that provide data access to multiple different storage cartridges. According to one implementation, the shared control board 302 is incorporated a media player such as the media player 202 of FIG. 2 that is configured to move along a rack, cabinet, or drawer relative to stationary storage cartridges and to selectively couple with such cartridges to provide selective read and write access.

The shared control board 302 includes a PCBA supporting read/write control electronics including a R/W controller 322 and encryption electronics including a data encryption controller 326. The R/W controller 322 controls read/write circuitry (not shown) to generate and transmit read and write control signals to the storage cartridge 304, such as to control a spindle motor (e.g., to spin to up a disk), voice control motor (e.g., to selectively actuate an arm to position read/write elements for data access at a target storage position), select a preamplifier, etc. The data encryption controller 326 performs actions for encrypting data that the R/W controller 322 is writing to the storage cartridge 304 and for decrypting data that the R/W controller is reading back from the storage cartridge 304.

An exemplary storage cartridge 304 includes elements the same or similar to those storage cartridges described with respect to FIG. 1-2. Additionally, the storage cartridge 304 includes a unique device identifier 310. When the shared control board 302 detects a new coupling to the storage cartridge 304, the R/W controller 322 executes a firmware command to retrieve the unique device identifier 310 from the storage cartridge 304. As used herein, a "new coupling" may refer to a new physical coupling between a drive and the shared control board 208 or, alternatively, to a power-on sequence of a drive, such as a power-on sequence that occurs responsive to a new physical drive coupling or a drive reboot.

The unique device identifier 310 (a device ID) is stored on or within the storage cartridge 304 at a location external to a primary storage medium 312 (e.g., a disk). The unique device identifier 310 may assume a variety of forms readable in a variety of different ways. In one implementation, the unique device identifier 310 is a bar code scannable by a bar code reader on the shared control board 302. In another implementation, the unique device identifier 310 is included within an RFID tag or smart label of the storage cartridge 304 that is readable by an RFID reader or smart label reading mechanism located on the shared control board 302. In yet still another implementation, the unique device identifier is included within an NFC tag readable by an NFC reader located on the shared control board 302. In still other implementations, the unique device identifier 310 may be stored on a small flash chip included in the storage cartridge 304 or, alternatively, within a preamp chip of a drive preamplifier.

In some implementations, the R/W controller 322 transmits the unique device identifier 310 to the data encryption controller 326, and the data encryption controller accesses an encryption key table 328 to determine whether an encryption key has already been saved in association with the unique device identifier. Although the encryption key table 328 is shown stored locally within the shared control board 302, the encryption key table 328 may, in some implementations, be stored in a location external to the shared control board 302 such that the data encryption controller 326 accesses the encryption key table over a local or wide-area network.

In one implementation, the encryption key table 328 stores a listing of unique device identifiers for different devices (e.g., device IDs, as shown in the encryption key table 328) such that each unique device identifier is associated with a corresponding public key and a private key.

In one implementation, if the data encryption controller 326 determines that the encryption key table 328 does not yet include the unique device identifier 310 retrieved from the storage cartridge 304, the data encryption controller 326 executes actions to initialize the storage cartridge 304. In one implementation, the data encryption controller 326 begins initializing the storage cartridge 304 by providing the unique device identifier 310 to a system host 314 and prompting the system host 314 for a public key to use in association with the storage cartridge 304. The system host 314, in response, specifies a public key (e.g., a desired passcode set by a system administrator). The data encryption controller 326, in turn, determines a private key (also referred to herein as the encryption key) to use in association with the specified public key and the unique device identifier. Although select implementations may permit a system administrator or host device to select the private key, other implementations select and store the encryption key exclusively within the shared control board 302 such that the private key is not known to any external processing entity or human.

In one implementation, the shared control board 302 stores a single private key that is used in connection with each of multiple device IDs. For example, the shared control board 302 may be configured to selectively couple with each of several (e.g., 10-500) different storage cartridges and to use a same encryption key for encrypting and decrypting data on each of the different storage cartridges. In other implementations, the shared control board 302 stores a single, different private key in association with each one of the multiple different stored unique device identifiers. For example, the private key may be automatically generated by the data encryption controller 326 responsive to receipt of the public key associated with the unique device identifier 310. The data encryption controller 326 stores the device ID (e.g., the unique device identifier 310) or location in association with both the host-provided public key and the selected private key.

Upon receipt of a read/write command (i.e., a read command or write command) from the system host 314, the data encryption controller 326 determines which one of the stored device IDs includes a storage location specified by the read/write command. For example, the shared control board 302 may store a mapping between device IDs and corresponding logical block addresses (LBA) utilized by the system host 314. Upon determining the device ID of the target storage cartridge for the received read/write command, the data encryption controller 326 determines the associated private key for the device ID.

In some implementations, the data encryption controller 326 prompts the system host 314 to re-supply the public key for the target storage drive in association with each individual access (read or write) to that drive. In other implementations, the data encryption controller 326 only prompts the system host 314 to re-supply the public key in read/write scenarios satisfying certain predefined security conditions, such as when the target storage drive has been offline in excess of a threshold time period, when the target storage drive has been removed and re-inserted into a rack of the secure cartridge-based library 300, or in accordance with other predefined security rules.

In scenarios where the data encryption controller 326 enforces security rules mandating that the system host 314 re-supply the public key prior to execution of a requested read or write to a target storage drive, the data encryption controller 326 prompts the system host 314 for the public key and, upon receipt of a supplied public key, determines whether the supplied public key matches the stored public key associated with the device ID for the target storage drive.

When the public key is authenticated (e.g., when the supplied public key matches the stored public key), the data encryption controller 326 loads an encryption circuit (not shown) on the shared control board 302 with the corresponding private key (the encryption key). The R/W controller 322 then executes the host-requested read or write command. In the case of a write command, the data encryption controller 326 directs the incoming data through the encryption circuit such that the data is encrypted with the private key on the shared control board 302 while in route to the target storage drive (e.g., the storage cartridge 304). In the case of a read command, the data encryption controller 326 receives encrypted data from the R/W controller 322 and decrypts the outgoing data with the private key while the data is in route back to the system host 314.

Figure 4:
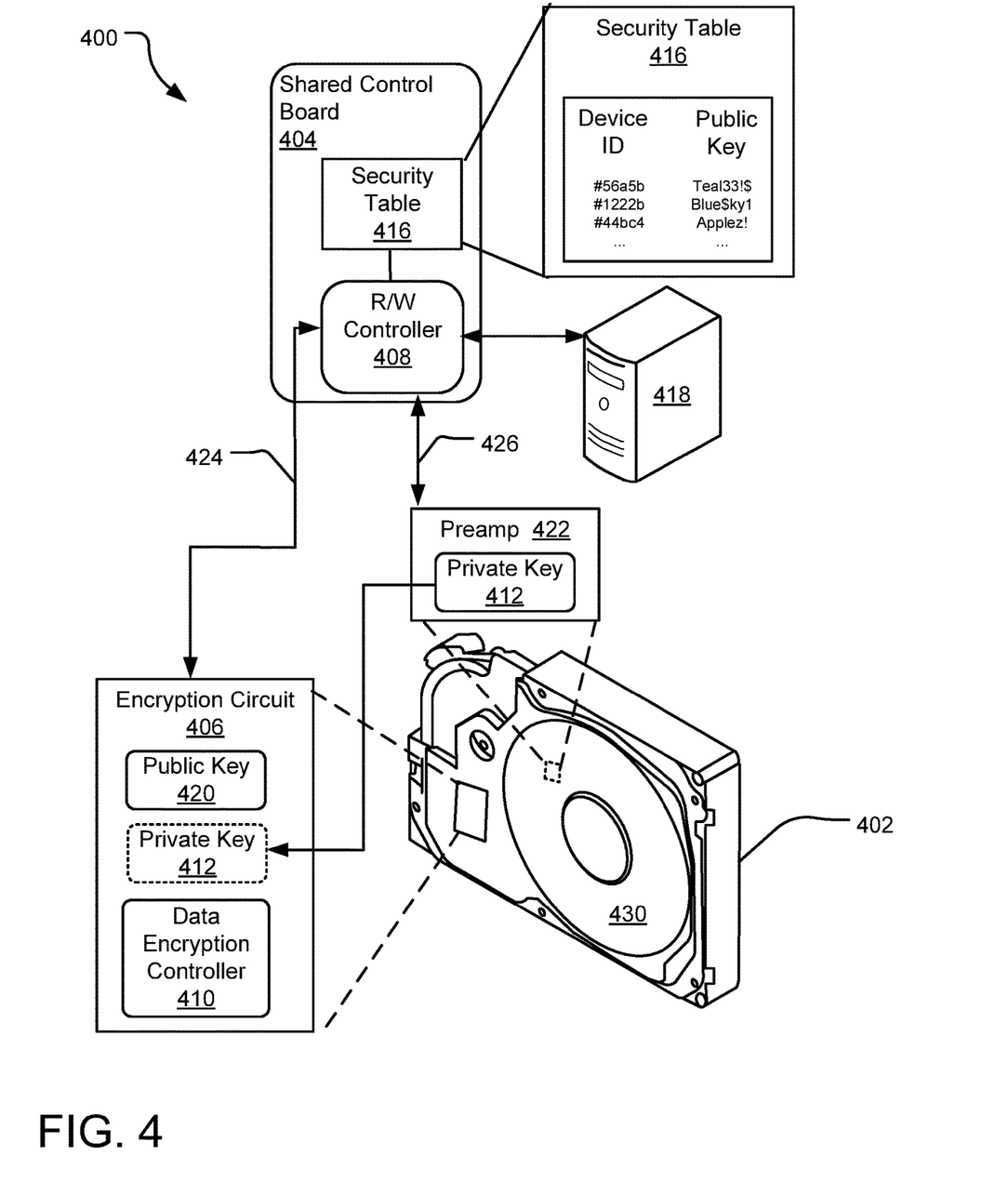
FIG. 4 illustrates aspects of another example secure cartridge-based storage system that encrypts data stored on each of a number of storage cartridges in a rack-based library.

FIG. 4 illustrates aspects of another example secure cartridge-based storage system 400 that encrypts data stored on each of a number of storage cartridges (e.g., a storage cartridge 402) in a rack-based library. Each storage cartridge in the secure cartridge-based storage system 400 is designed to be selectively accessed by a media player that includes a shared control board 404. The shared control board supports a set of read/write electronics (e.g., a R/W controller 408) shared by multiple storage cartridges in the system. In one implementation, the shared control board 404 is incorporated with a media player with characteristics (e.g., self-ambulation controls) the same or similar to those described with respect to FIG. 2-3.

In contrast to the shared control boards described with respect to FIG. 2-3, the shared control board 404 does not include circuitry or controls for encrypting or decrypting data in route to and from the various storage cartridges. Instead, the storage cartridge 402 includes an encryption circuit 406 that performs data encryption and decryption actions. Since the storage cartridge 402 lacks read/write controls (e.g., does not include an SoC and/or printed circuit board), the encryption circuit 406 is located in a non-traditional area.

In one implementation, the encryption circuit 406 is integrated within an interposer of the storage cartridge 402. The interposer is the element within the storage cartridge 402 that provides an electrical and physical interface for mating the storage cartridge 402 with shared control board 404 (and more specifically, with the R/W controller 408 and other control electronics on the shared control board 404).

The cartridge 402 also stores a private key 412 that is used by the encryption circuit 406 when encrypting and decrypting data being written to the storage media 430. In different implementations, the private key 412 may be stored in different locations. In the example of FIG. 4, the private key 412 is stored in a hardware register of a read/write preamplifier 420. In another implementation, the private key 412 for the storage cartridge 402 is stored in a flash chip or other non-volatile memory in the interposer of the storage cartridge 402 that is accessible to a data encryption controller 410 (e.g., a microprocessor) of the encryption circuit 406. The data encryption controller 410 of the encryption circuit executes logic to selectively access the private key 412 responsive to receipt and authentication of a specified public key 414 from the shared control board 404.

According to one implementation, the public key 420 is set up in association with the storage cartridge 402 upon drive initialization (e.g., the first time that the storage cartridge is connected to the shared control board 404). Each storage cartridge in the system 400 may initialized with a different private key. When the shared control board 404 detects a new coupling to the storage cartridge 402, the R/W controller 408 executes a firmware command to retrieve a unique device identifier from the storage cartridge 402, such as in the same or similar manner as that described with respect to the unique device identifier 310 of FIG. 3. For example, the unique device identifier may assume the form of a bar code, RFID, NFC chip, etc.

In some cases, upon receiving the unique device identifier from the storage cartridge 402, the R/W controller 408 accesses a security table 416 which is, for example, table stored locally in volatile or non-volatile memory on the shared control board 404 and/or stored in a remote location accessible to the R/W controller 408 through a host communication interface. The R/W controller 408 determines whether the unique device identifier for the storage cartridge 402 already exists in the security table 416. If the unique device identifier already exists in the security table 416, the R/W controller 408 takes no further action with respect to the storage cartridge 402 until subsequently receiving a read/write command targeting a storage location within the storage cartridge 402.

If, however, the R/W controller 408 determines that the unique device identifier retrieved from the storage cartridge 402 is not yet in the security table 416, further actions are taken for drive initialization. In one implementation, the R/W controller 408 transmits a cartridge initialization request to a system host 418. This request may, for example, convey the unique device identifier to the system host 418 and prompt the system host 418 for a public key to use in association with the storage cartridge 402. The system host 418, in response, specifies a public key (e.g., a desired passcode set by a system administrator), and the R/W controller 408 stores the specified public key in the security table 416 in association with the unique device identifier for the storage cartridge. Unlike the implementations of FIG. 2 and FIG. 3, the shared control board 404 does not store the private key 412.

In other implementations, the shared control board 404 does not store the public key in association with each device (e.g., as shown in FIG. 4) but instead queries the system host 418 for the public key each time the associated drive is accessed.

When the storage cartridge 402 is first initialized (e.g., the first time it is used by an end client), the R/W controller 408 provides the host-specified (user-selected) public key to the encryption circuit 406 where it is stored locally as the public key 420. The private key 412, in contrast, may be selected and hardcoded (e.g., within the preamp 422 or other chip on the storage cartridge 402) during a factory manufacturing process.

Upon receipt of a read/write command from the system host 418, the R/W controller 408 determines the device ID (unique device identifier) for a storage cartridge targeted by the read or write command. The R/W controller 408 retrieves the public key associated with the corresponding device ID from the security table 416 and passes the public key from the security table 416 to the encryption circuit 406 in the storage cartridge 402. The data encryption controller 410 then determines whether the received public key matches the stored public key 420 and, in response to the successful authentication of the public key (e.g., when a match exists), the data encryption controller 410 retrieves the private key 412 (e.g., from the preamp 422 or other chip location) and thereby readies itself for encryption and decryption operations.

In FIG. 4, the storage cartridge 402 is shown to include a data channel 424 between the encryption circuit 406 in the storage cartridge 402 that exists independent of various data channels 426 between the read/write preamp 422 and the read/write controller 408.

During an example read sequence of the system 400, encrypted data is read from the storage cartridge 402 and transmitted in analog form along one of the channels 426. The read/write controller 408 converts the data into a digital format, retrieves a public key for the cartridge from the security table 416 (as described above), and transmits the digital read data and the retrieved public key along the data line 424 to the encryption circuit 406. The encryption circuit 406 authenticates the received public key by confirming a match to the stored public key 420, retrieves the private key 412 responsive to authentication of the public key 420, uses the private key 412 to decrypt the read data, and transmits the decrypted read data back to the R/W controller 408 along the data line 424.

During an example write sequence of the system 400, data is transmitted between the read/write controller 408 and the encryption circuit 406 in digital format using the data line 424. The read/write controller 408 also retrieves the appropriate public key from the security table 416 (as described above) transmits the retrieved public key to the encryption circuit using the data line 424. The encryption circuit 406 authenticates the received public key by confirming a match to the stored public key 420, retrieves the private key 412 responsive to authentication of the public key 420, and uses the private key to encrypt the write data. In one implementation, the encrypted write data is transmitted back to the read/write controller 408 via the data line 424 before being transmitted down to the read/write preamp 422 for writing to the storage media 430. In another implementation, the encrypted write data is transmitted directly from the encryption circuit 406 to the read/write preamp 422 without first traveling back up to the shared control board 404.

In various implementations, the encryption circuits shown in any of FIG. 2-4 include logic to allow for repurposing of the storage cartridges (e.g., secure erase and deletion of the public key such that may be reinitialized by a new user). For example, the public/private keys may be stored in a non-volatile memory which is either written once or multiple times throughout the life of the storage cartridge, such as following each secure erase of the entire drive.

Figure 5:
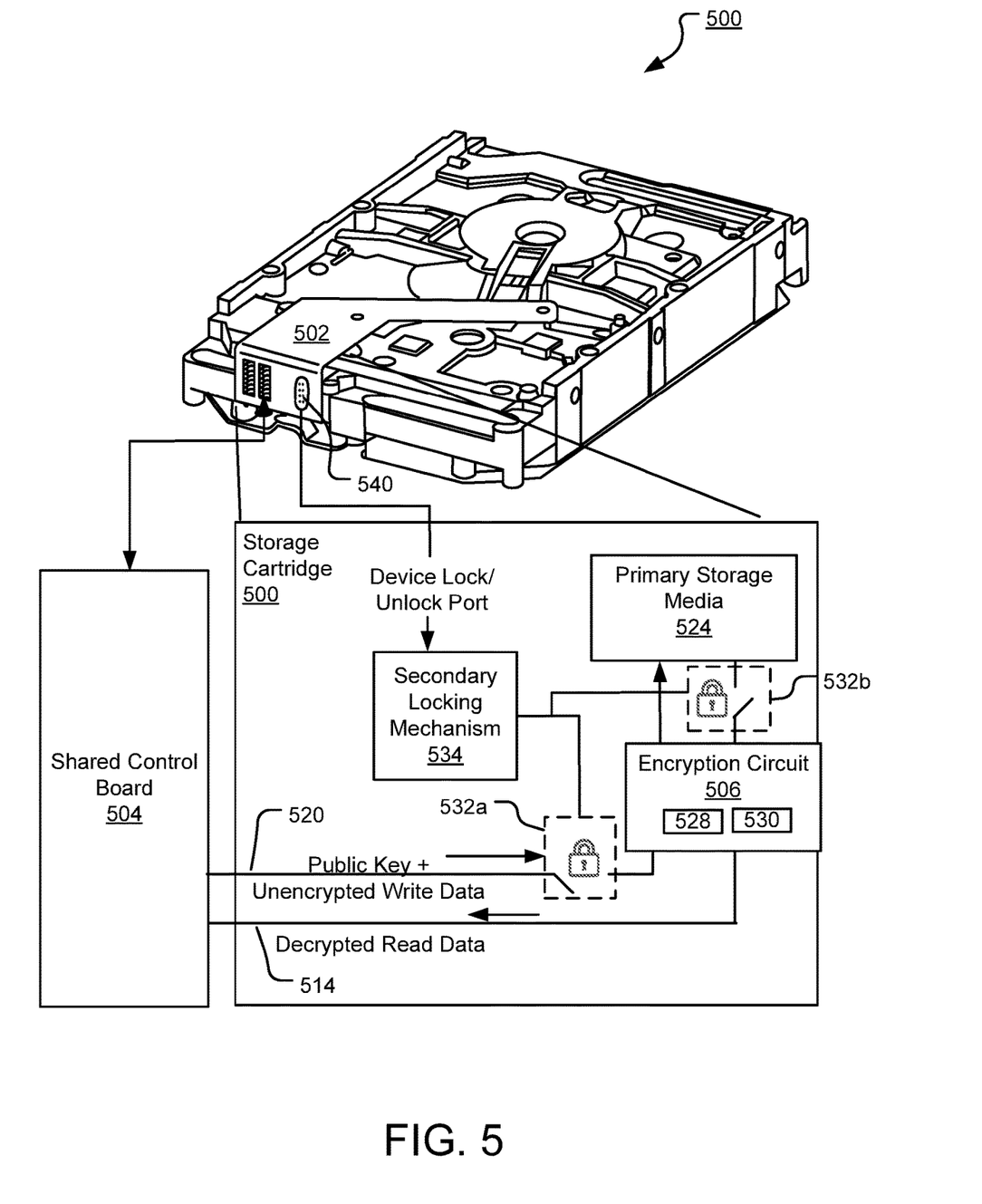
FIG. 5 illustrates an example of a storage cartridge suitable for use in a secure cartridge-based storage system.

FIG. 5 illustrates an example of a storage cartridge 500 suitable for use in a secure cartridge-based storage system, such as that shown and described with respect to FIG. 4. The storage cartridge 500 is designed to be selectively accessed by a media player that includes a shared control board 504. The shared control board 504 support a set of read/write electronics that are adapted read and write data to each of multiple storage cartridges in the system. Aspects of the shared control board 504 and/or the storage cartridge 500 not described specifically with respect to FIG. 5 may be the same or similar to other like-named components described elsewhere herein.

Like the storage cartridge of FIG. 4, the storage cartridge 500 includes an encryption circuit 506 that performs data encryption and decryption actions. The encryption circuit 506 stores a private key 528 that is used as the encryption key and also stores a public key 530 that is used to determine whether the shared control board 504 is authorized to use the stored private key 528 in data encryption and decryption activities. The private key 528 is, for example, generated and encoded during a drive manufacturing process while the public key 530 is selected by a user and saved in the encryption circuit 506 during a drive initialization process.

In different implementations, the encryption circuit 506 and the stored private key 528 may reside in different locations within the storage cartridge 500. In one implementation, the encryption circuit is included within an interposer 502 of the storage cartridge 500 that provides the physical and electrical interfaces for coupling the storage cartridge 500 with the control electronics on the shared control board 504. For example, the encryption circuit 506 may include a flash chip or other small storage media that stores the private key 528 and the public key 530. A microprocessor of the encryption circuit 506 selectively accesses the private key 528 for an encryption or decryption process only after verifying that a public key received from the shared control board 504 matches the stored public key 530.

In another implementation, a read/write preamplifier chip of the storage cartridge stores the private key 528 and the public key 530, such as in one or more preamp hardware registers. The read/write preamplifier is typically located on the actuator arm in close proximity to the head-gimbal assembly that supports the read and write elements. In this implementation, the read/write preamplifier is electrically coupled to the encryption circuit 506, which itself may be located on the actuator arm, in the interposer 502, or any other location on or within the storage cartridge 500. When the private key 528 is successfully retrieved from the preamp hardware register (e.g., responsive to verifying that a received public key matches the stored public key 530), the private key 528 is loaded into the encryption circuit 506 and used to encrypt or decrypt data in an immediately subsequent read or write operation. In one implementation, the encryption circuit 506 is included within the preamplifier. In another implementation, the encryption circuit 506 is included on a separate encryption/decryption chip within the storage cartridge. For example, the encryption/decryption chip is loaded with private key 528 from the preamp hardware register once the public key 530 is authenticated.

Notably, the private key 528 may be more secure in the latter implementation described above (e.g., when stored in a register of read/write preamplifier rather than within the interposer 502) since data within a read/write preamplifier of a storage cartridge typically may not be accessed without damaging the read/write channels to utilized to access the primary storage media 524. Thus, an unauthorized attempt to read the data stored in the preamplifier would likely jeopardize the possibility of reading data from the primary storage media 524 in the future. In contrast to the implementation of FIG. 4, the storage cartridge 500 includes a secondary locking mechanism 534 that controls a switch network 532 (comprising switches 532a, 532b) to selectively open and close data channels between the encryption circuit 506 and the shared control board 504. This secondary locking mechanism 534 acts as a secondary security measure, on top of the encryption circuit 506, to protect the data stored on a primary storage media 524. In FIG. 5, the switches 532a, 532b are to be understood as exemplary hardware components suitable for implementing the described functionality of the secondary locking mechanism 534 but not in any way limiting with respect to the actual form of the switch network 532 in its various implementations.

When the secondary locking mechanism 534 toggles the switch network 532 into a locked state (as shown), data cannot flow along the channels 514, 520 to and from the encryption circuit 506. As such, the encryption circuit 506 is unable to receive the public key 530. As a consequence of this, the encryption circuit 506 is unable to encrypt write data in route to the primary storage media 524 and unable to decrypt read data read from the primary storage media 524.

The encryption circuit 506 is able to receive the public key from the shared control board 504 only once the secondary locking mechanism 530 has selectively toggled the switch network 532 into an unlocked state. In one implementation, the secondary locking mechanism 534 is adapted to toggle the switch network 532 between the locked and unlocked states when a user provides valid key to a key port 540, such as by inserting a physical key into the key port 540 or otherwise directing a digital key through the key port 540 (e.g., by supplying a pin to an external device temporarily coupled to the key port 540 on the storage cartridge). In one implementation, the key port 540 is a physical port included on the interposer 502 that is separate from the port(s) utilized to establish the couplings with control electronics located on the shared control board 504. In various implementations, the key port 540 may assume a variety of different interface forms and use a variety of different data protocols. In one implementation, the key port 540 provides an I2C interface or other similar data line.

In one implementation, the storage cartridge 500 is selectively locked prior to initialization with a particular shared control board 504. When placing the storage cartridge 500 in a rack accessible by the shared control board 504, a user (system administrator) provides a key (physical or digital) to the key port 540 and thereby causes the secondary locking mechanism 534 to selectively engage the switch network 532 to toggle the encryption circuit 506 into the unlocked state. For example, a system administrator may couple a portable device (e.g., phone, tablet) to the key port 540 via an interface connection cable and provide the portable device with a digital key (e.g., pin, passcode, fingerprint, facial scan) that has been previously set-up for storage cartridge 500. The secondary locking mechanism 534 verifies that the received digital key matches a previously-stored key and, responsive to such verification, unlocks the switch network 532 to allow access to the encryption circuit 506.

In some implementations, the secondary locking mechanism 534 is configured with a hard-coded "retry limit" that effectively prevents a user from attempting to unlock the switch network 532 too many consecutive times without success. For example, the secondary locking mechanism 534 may transition into a lockdown mode after a threshold number of unsuccessful unlock attempts occur within a predefined time interval. While in the lockdown mode, the secondary locking mechanism 534 may not be selectively opened even if the correct digital key is supplied. In some cases, the secondary locking mechanism 534 remains in the lockdown mode until the user provides a retry reset key, such as a factory-provided key or a key set by a system administrator that is different than the digital key.

Figure 6:
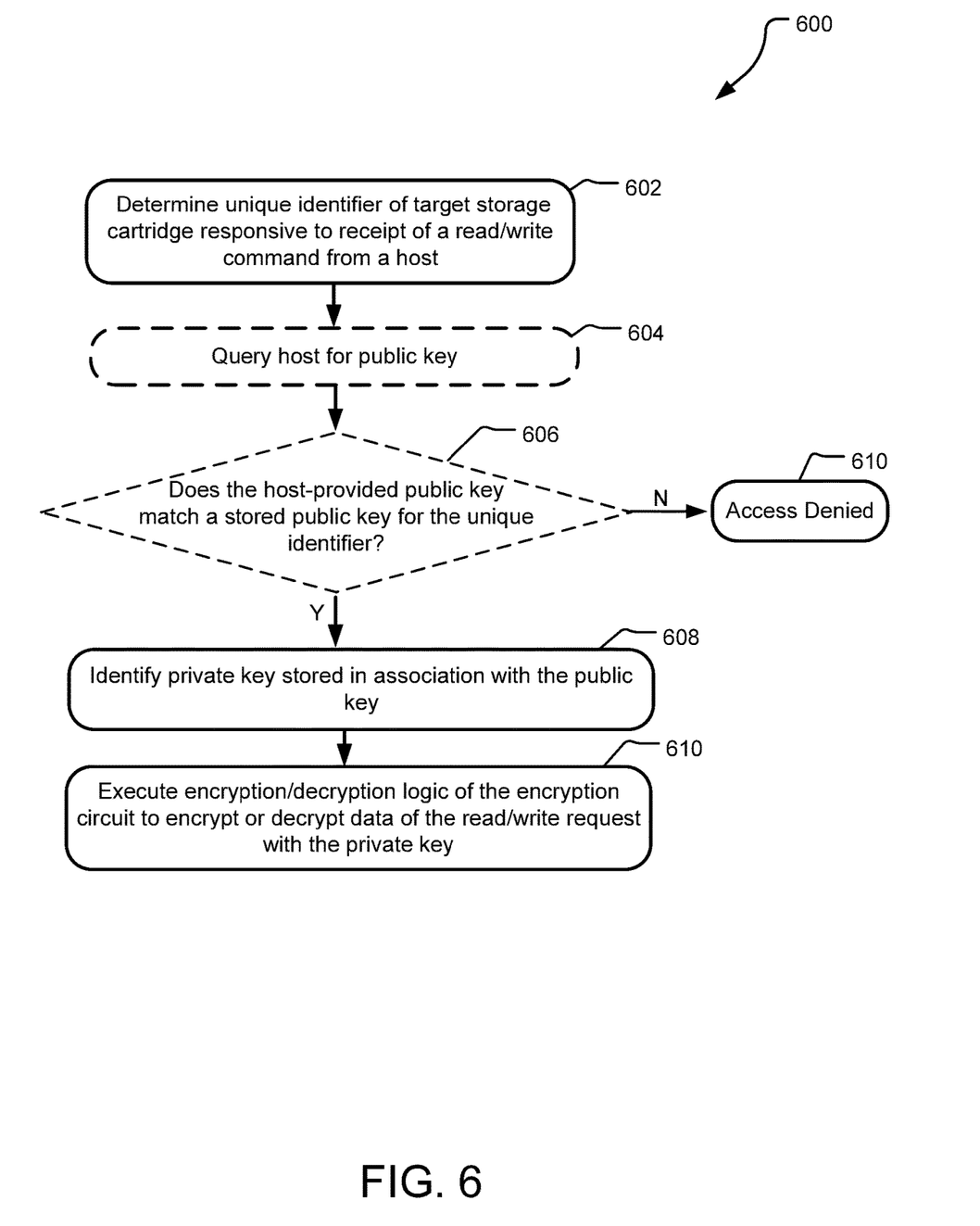
FIG. 6 illustrates example operations for encryption and decrypting data stored on a storage cartridge that lacks an independent set of read/write control electronics.

FIG. 6 illustrates example operations 600 for encryption and decrypting data stored on a storage cartridge that lacks an independent set of read/write control electronics (e.g., does not include an SoC). The storage cartridge is adapted to selectively couple with a media player including a control board supporting a set of read/write electronics and an encryption circuit. The control board performs all actions related to data encryption and decryption. In this system, no encryption keys are stored on the individual storage cartridge.

In response to receiving a read/write command from a host, a device identifying operation 602 determines a unique device identifier for a storage cartridge including a storage location targeted by the read/write command. In one implementation, each different physical storage cartridge in the system has a different unique device identifier. For example, the device identifying operation 602 may determine the unique device identifier by retrieving the identifier from a table that maps host logical addresses to physical storage locations within the storage system.

After determining the unique device identifier for the target storage cartridge, a query operation 604 queries the host device for a public key associated with the unique device identifier. This operation is shown in dotted lines, along with a determination operation 606, to indicate that these operations (604 and 606) may be conditionally skipped when the control board determines that security credentials have already been satisfactorily established for the target storage cartridge in accord with predetermined security conditions. In one implementation, security credentials are deemed established in accord with such conditions if a public key was provided and stored by the control board during initialization of the target storage cartridge within the control board and/or when no other security rule renders those credentials stale. For example, security credentials may be deemed unsatisfactory and stale in a wide array of scenarios in different implementations, such as when the target storage cartridge has been removed and recoupled to the storage system or when the target storage cartridge has not been accessed for a threshold period of time.

In scenarios where the query operation 604 is performed, the host device provides the encryption circuit with a public key and a determination operation verifies that the received public key matches a stored public key. When the received public key does not match the stored public key, an access operation 610 denies access to private key utilized for encryption and decryption of data on the target storage drive.

When security credentials are deemed satisfactory for the target storage drive (e.g., because the received public key matches a stored public key or because previously-received security credentials remain valid under the locally-imposed security conditions), access is granted to a private key associated with the unique device identifier, and an identifying operation 608 identifies a private key stored on the control board in association with the public key. An execution operation 610 executes logic of the encryption circuit to encrypt or decrypt data of the read/write request using the private key (e.g., data is decrypted in the case of a read request and encrypted in the case of a write request).

Figure 7:
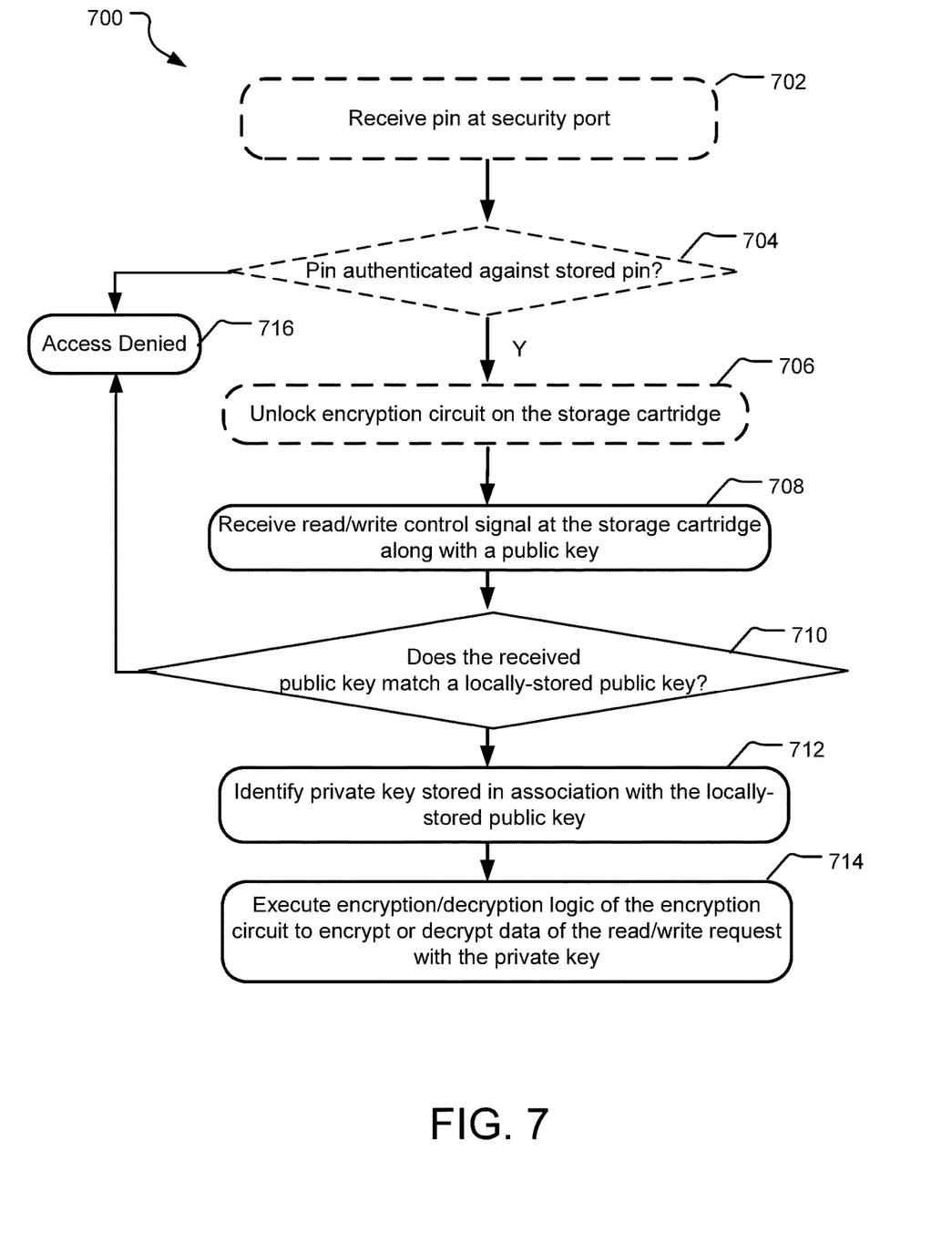
FIG. 7 illustrates example operations for encryption and decrypting data stored on a storage cartridge that lacks an independent set of read/write control electronics.

FIG. 7 illustrates example operations 700 for encryption and decrypting data stored on a storage cartridge that lacks an independent set of read/write control electronics. The storage cartridge is adapted to selectively couple with a media player including a control board supporting a set of read/write electronics and an encryption circuit. The example operations 700 describe implementations where data encryption and decryption operations occur within the storage cartridge rather than on the control board.

A pin receipt operation 702 receives a pin through a security port on a storage cartridge. The pin is, for example, a digital pin provided via user input to a secondary device that is temporarily coupled to the storage cartridge through the security port. The pin authentication check operation 704 authenticates the received pin by comparing it to a stored pin. If the received pin does not match the stored pin, an encryption circuit on the storage cartridge remains locked such that neither data nor keys used in encryption (e.g., a public key) can be received and processed by the encryption circuit. An access operation 716 therefore denies any attempt to access the storage cartridge while the encryption circuit remains locked.

If it is determined that the received pin matches the stored pin, an unlocking operation 706 unlocks the encryption circuit on the storage cartridge. For example, the unlocking operation may connect a switch to open a data channel between the media player and the encryption circuit on the storage cartridge. Once opened in this manner, the data channel may be used to transmit information used in authenticating a user or media player with respect to a particular encryption key (private key) used to encrypt and decrypt data stored on the storage cartridge.

In FIG. 7, the pin receipt operation 702, pin authentication check operation 704, and unlocking operation 706 are shown in dotted lines to indicate that these operations (702, 704, and 706) may be conditionally skipped in some implementations that lack a secondary locking mechanism such as that described with respect to FIG. 4.

Once the encryption circuit has been unlocked as described above, a receiving operation 708 receives a read/write control signal at the storage cartridge along with a public key. The public key is, for example, a key determined to be associated with a unique device identifier of the storage cartridge as described with respect to FIG. 4-5.

A determination operation 710 determines whether the received public key matches a locally-stored public key. When such a match does not exist, the access operation 716 denies the media player access to the private key, rendering the media player effectively unable to read data from the storage cartridge or securely write data to the storage cartridge.

When the determination operation 710 determines that the received public key matches the locally-stored public key, an identification operation 710 identifies a private key stored in association with the locally-stored public key. An execution operation 712 executes logic of the encryption circuit to encrypt or decrypt data of the read/write request using the private key (e.g., data is decrypted in the case of a read request and encrypted in the case of a write request).

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A storage system comprising:
a first storage cartridge and a second storage cartridge, each including a storage media encased in an enclosure;
control electronics on a shared control board adapted to:
removably couple to the first storage cartridge and the second storage cartridge;
retrieve a first unique device identifier from the first storage cartridge;
retrieve a first encryption key stored on the shared control board in association with the first unique device identifier from the first storage cartridge;
utilize the first encryption key at a location on the shared control board to encrypt or decrypt data that is in transit to or from a target storage location on the first storage cartridge without transmitting the first encryption key to the first storage cartridge,
retrieve a second unique device identifier from the second storage cartridge;
determine that the second unique device identifier is not currently stored in association with an encryption key;
transmit an encryption key initialization request to a host device;
receive a host-specified public key responsive to the transmission of the encryption key initialization request;
associate a second encryption key with the host-specified public key;
and locally store the unique device identifier for the second storage cartridge in association with the host-specified public key and the second encryption key at a location on the shared control board.

2. The storage system of claim 1, wherein the read/write control electronics retrieve the first encryption key by:
prompting a host for a public key associated in memory with the first unique device identifier;
receiving the public key from the host responsive to the prompt;

verifying the received public key matches a stored public key;

and retrieving the first encryption key responsive to successful verification of the public key.

3. The storage system of claim 1, wherein the storage system stores a single encryption key in association with a plurality of unique device identifiers and uses the single encryption key to encrypt and decrypt data on each of a plurality of storage devices identified by a corresponding one of the unique device identifiers.

4. The storage system of claim 1, wherein the storage system stores a unique encryption key in association with each different one of a plurality of unique device identifiers.

5. The storage system of claim 1, wherein the first unique drive identifier is stored on or within the enclosure of the first storage cartridge at a location external to the storage media of the first storage cartridge.

6. The storage system of claim 1, wherein the first unique drive identifier is at least one of a scannable bar code, RFID tag, and NFC tag.

7. A method comprising:

transmitting a control signal from a shared control board to retrieve a first unique device identifier from a first storage cartridge removably coupled to a set of read/write control electronics located on the shared control board, the first storage cartridge including a storage media encased in an enclosure;

retrieving a first encryption key stored on the shared control board in association with the first unique device identifier;

and utilizing the first encryption key at a location on the shared control board to encrypt or decrypt data that is in transit to or from a target storage location on the first storage cartridge without transmitting the encryption key to the first storage cartridge;

transmitting another control signal from the shared control board to retrieve a second unique device identifier from a second storage cartridge removably coupled to the shared control board;

determining that the second unique device identifier is not currently stored in association with an encryption key;

and transmitting an encryption key initialization request to a host device;

receiving a host-specified public key responsive to the transmission of the encryption key initialization request;

selecting a second encryption key to associate with the host-specified public key;

and locally storing the second unique device identifier for the second storage cartridge in association with the host-specified public key and the second encryption key at a location on the shared control board.

8. The method of claim 7; wherein retrieving the first encryption key further comprises:

prompting a host for a public key associated in memory with the first unique device identifier;

receiving the public key from the host responsive to the prompt;

verifying the received public key matches a stored public key;

and retrieving the first encryption key responsive to successful verification of the public key.

9. The method of claim 7, wherein the shared control board stores a single encryption key in association with a plurality of unique device identifiers and uses the single encryption key to encrypt and decrypt data on each of a plurality of storage devices identified by a corresponding one of the unique device identifiers.

10. The method of claim 7, wherein the shared control board stores a unique encryption key in association with each different one of a plurality of unique device identifiers.

11. The method of claim 7, wherein the first unique drive identifier is stored on or within the first storage cartridge.

12. The method of claim 7, wherein the first unique drive identifier is at least one of a scannable bar code, RFID tag, and NFC tag.

13. One or more tangible computer-readable storage media encoding computer-executable instructions for executing a computer process comprising:

transmitting a control signal from a shared control board to retrieve a first unique device identifier from a first storage cartridge removably coupled to a set of read/write control electronics located on the shared control board, the first storage cartridge including a storage media encased in an enclosure;

retrieving a first encryption key stored on the shared control board in association with the first unique device identifier;

and utilizing the first encryption key at a location on the shared control board to encrypt or decrypt data that is in transit to or from a target storage location on the storage media without transmitting the first encryption key to the first storage cartridge;

transmitting another control signal from the shared control board to retrieve a second unique device identifier from a second storage cartridge removably coupled to the shared control board;

determining that the second unique device identifier is not currently stored in association with an encryption key;

and transmitting an encryption key initialization request to a host device;

receiving a host-specified public key responsive to the transmission of the encryption key initialization request;

selecting a second encryption key to associate with the host-specified public key;

and locally storing the second unique device identifier for the second storage cartridge in association with the host-specified public key and the second encryption key at a location on the shared control board.

14. The one or more tangible computer-readable storage media of claim 13, wherein retrieving the first encryption key further comprises:

prompting a host for a public key associated in memory with the first unique device identifier;

receiving the public key from the host responsive to the prompt;

verifying the received public key matches a stored public key associated with the first unique device identifier;

and retrieving the first encryption key responsive to successful verification of the public key.

15. The one or more tangible computer-readable storage media of claim 13, wherein the shared control board stores a single encryption key in association with a plurality of unique device identifiers and uses the single encryption key to encrypt and decrypt data on each of a plurality of storage devices identified by a corresponding one of the unique device identifiers.

16. The one or more tangible computer-readable storage media of claim 13, wherein the shared control board stores a unique encryption key in association with each different one of a plurality of unique device identifiers.

\* \* \* \* \*